(12) United States Patent
Kim et al.

(10) Patent No.: US 10,170,056 B2
(45) Date of Patent: Jan. 1, 2019

(54) METHOD OF CONTROLLING MIRROR DISPLAY AND ELECTRONIC DEVICE FOR THE SAME

(71) Applicant: Samsung Electronics Co., Ltd., Gyeonggi-do (KR)

(72) Inventors: Tae-Seon Kim, Seoul (KR); Youn-Hyoung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 5 days.

(21) Appl. No.: 14/722,896

(22) Filed: May 27, 2015

(65) Prior Publication Data

US 2016/0140911 A1    May 19, 2016

(30) Foreign Application Priority Data

Nov. 18, 2014  (KR) .................. 10-2014-0160913

(51) Int. Cl.
*G09G 3/34*    (2006.01)
*G06F 1/26*    (2006.01)
*G09G 5/10*    (2006.01)

(52) U.S. Cl.
CPC ........... *G09G 3/3406* (2013.01); *G06F 1/263* (2013.01); *G09G 5/10* (2013.01); *G09G 2330/021* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 5,485,073 A * | 1/1996 | Kasashima | ........... | G06F 1/1616 320/106 |
| 5,493,685 A * | 2/1996 | Zenda | ................ | G06F 1/3218 713/321 |
| 5,854,617 A * | 12/1998 | Lee | .................... | G06F 1/3218 345/102 |
| 6,812,649 B2 * | 11/2004 | Kim | .................. | H05B 41/3922 315/149 |
| 7,535,196 B2 * | 5/2009 | Nagasawa | ............... | H02J 9/061 320/106 |
| 7,755,611 B2 * | 7/2010 | Barr | ..................... | G06F 1/1601 345/156 |
| 9,122,320 B1 * | 9/2015 | Rowles | ................ | G06T 1/0007 |
| 2009/0174366 A1 * | 7/2009 | Ahmad | ................ | H02J 7/0055 320/114 |

(Continued)

FOREIGN PATENT DOCUMENTS

GB        2 345 410        7/2000

OTHER PUBLICATIONS

European Search Report dated Sep. 28, 2015 issued in counterpart application No. 15170083.8-1903, 7 pages.

*Primary Examiner* — Jimmy Vu
*Assistant Examiner* — Laura Yesildag
(74) *Attorney, Agent, or Firm* — The Farrell Law Firm, P.C.

(57) ABSTRACT

A method of controlling a mirror display and an electronic device are provided. The method includes identifying whether external power is input to the electronic device; and providing operation power to the mirror display by selectively providing one of the external power and battery power to the mirror display as the operating power according to whether the external power is input to the mirror display.

8 Claims, 11 Drawing Sheets

(56) References Cited

U.S. PATENT DOCUMENTS

2013/0293722 A1* 11/2013 Chen .................. F21V 14/02
348/164
2015/0002262 A1* 1/2015 Geerlings .......... G07C 9/00309
340/5.25

* cited by examiner ic device.

METHOD OF CONTROLLING MIRROR DISPLAY AND ELECTRONIC DEVICE FOR THE SAME

PRIORITY

This application claims priority under 35 U.S.C. § 119(a) to Korean Patent Application Serial No. 10-2014-0160913, which was filed in the Korean Intellectual Property Office on Nov. 18, 2014, the entire content of which is incorporated herein by reference.

BACKGROUND

1. Field of the Invention

The present invention relates generally to mirror displays, and more particularly, to a method and an electronic device for controlling a mirror display.

2. Description of the Related Art

A device including a combination of a mirror and a display is referred to as a mirror display. Research has been conducted on technology for displaying information on weather, schedules, health and the like using a mirror display (hereinafter, "smart mirror" technology).

A mirror display is a device in which a one-way mirror having a one-way transparent characteristic is combined with a display panel. When the display panel, which is positioned on a rear surface of the one-way mirror, is turned off, the mirror display functions as a mirror. When the display panel is turned on, light emitted from the display panel passes through the one-way mirror, so that the mirror display provides a display function.

The mirror display in the related art receives external power through a power supply cable, and commercial power may be used as a source of the external power.

The mirror display using only external power has a limitation in mobility, so that usability thereof may deteriorate. In order to improve mobility of the mirror display, embedding a battery in the mirror display may be considered. However, when the size of a display of the mirror display is largest, for example, the display has a size of at least 14 inches, a large amount of power may be consumed when operating the display. In this case, it may be difficult to configure the mirror display so that the mirror display is operated only by a battery.

SUMMARY OF THE INVENTION

The present invention has been made to address the above-mentioned problems and disadvantages, and to provide at least the advantages described below. An aspect of the present invention provides a method of controlling a mirror display capable of improving mobility and usability of the mirror display, and an electronic device for the same.

Another aspect of the present invention may provide a method of controlling a mirror display capable of selectively using one of external power and battery power as operation power of the mirror display according to whether the external power is input and efficiently managing the battery power, and an electronic device for the same.

According to an aspect of the present invention, a method of controlling a mirror display is provided. The method includes identifying whether external power is input to the mirror display; and providing operation power to the mirror display by selectively providing one of the external power and battery power to the mirror display as the operating power according to whether the external power is input to the mirror display.

According to another aspect of the present invention, an electronic device is provided. The electronic device includes a battery; a mirror display unit configured to perform a mirror display function; and a power supply unit configured to provide operation power to the mirror display unit by selectively providing one of external power and battery power to the mirror display unit as the operating power according to whether the external power is input to the electronic device.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
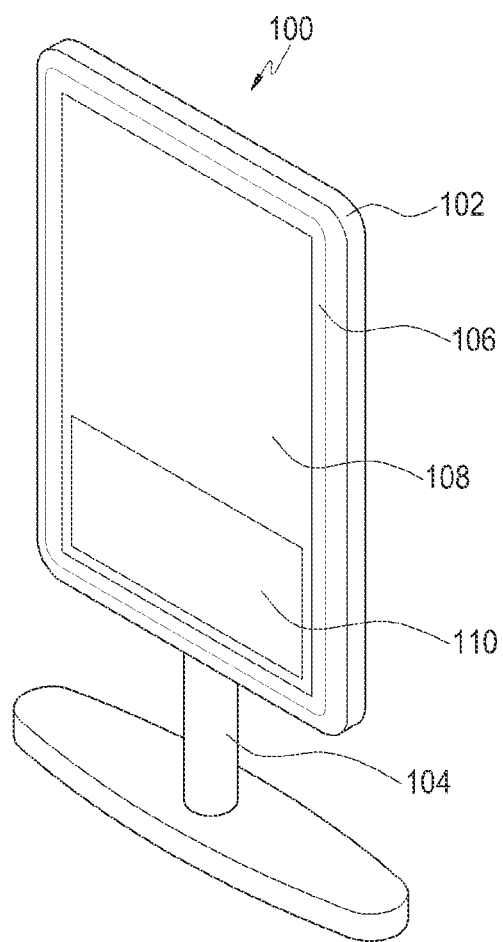
FIG. 1 is a perspective view illustrating a mirror display according to various embodiments of the present invention.

Hereinafter, various embodiments of the present invention will be described in detail with reference to the accompanying drawings. However, the following description does not limit various embodiments of the present invention to particular forms, and the present invention should be construed to cover all modifications, equivalents, and/or alternatives falling within the spirit and scope of various embodiments of the present invention. In the drawings and the corresponding description, the same or similar reference numerals may be used to designate the same or similar elements.

As used herein, the terms "include" and "may include" refer to the existence of a corresponding disclosed function, operation or element that may be used in various embodiments of the present invention and does not limit one or more additional functions, operations, or elements. The terms such as "include" and/or "have" may denote a certain characteristic, number, step, operation, element, component or a combination thereof, but do not exclude the existence of or a possibility of addition of one or more other characteristics, numbers, steps, operations, elements, components or combinations thereof.

As used herein, the expression "A or B", "at least one of A and/or B", or "one or more of A and/or B" include any or all possible combinations of items enumerated together. For example, the expression "A or B", "at least one of A and B", or "at least one of A or B" may include (1) at least one A, (2) at least one B, or (3) both at least one A and at least one B.

As used herein, the expressions such as "first", "second", or the like may modify various elements in various embodiments but may not limit corresponding elements. For example, the above expressions do not limit the sequence and/or importance of the corresponding elements. The expressions may be used to distinguish an element from another element. For example, a first user device and a second user device indicate different user devices although both of them are user devices. For example, without departing from the scope of the present invention, a first element may be referred to as a second element. Similarly, the second element also may be referred to as the first element.

The term "specified" used in the present disclosure may have the meaning of, for example, "predetermined" or "specific" according to a situation.

When an element is described as "coupled" or "connected" to another element, the first element may be directly coupled or connected to the second, and a third element may be "coupled" or "connected" between the first and second elements. Conversely, when one element is "directly coupled" or "directly connected" to another element, it may be construed that a third element does not exist between the first element and the second element.

Terms are used herein merely to describe specific embodiments of the present invention and do not limit the scope of the present invention. As used herein, the singular forms are intended to include the plural forms as well, unless the context clearly indicates otherwise.

Unless defined differently, all terms used herein, which include technical terminologies or scientific terminologies, have the same meaning as understood by a person skilled in the art to which the present invention belongs. Such terms as those defined in a generally used dictionary are to be interpreted to have the same contextual definitions in the relevant field of art, and are not to be interpreted to have ideal or excessively formal meanings unless clearly defined herein.

An electronic device according to various embodiments of the present invention may be independently used or included in, combined with, or communicably connected to various electronic devices for use.

An electronic device according to various embodiments of the present invention may be operated in a Machine-to-Machine (M2M) or Internet of Things (IoT) environment.

For example, electronic device according to various embodiments of the present invention may include at least one of a smartphone, a tablet Personal Computer (PC), a mobile phone, a video phone, an Electronic book (e-book) reader, a desktop PC, a laptop PC, a netbook computer, a Personal Digital Assistant (PDA), a Portable Multimedia Player (PMP), a Moving Picture Experts Group 1 (MPEG-1) audio layer-3 (MP3) player, a mobile medical appliance, a camera, and a wearable device (e.g., a Head-Mounted-Device (HMD), such as electronic glasses, electronic clothes, an electronic bracelet, an electronic necklace, an electronic appcessory, electronic tattoos, or a smart watch).

According to some embodiments of the present invention, the electronic device may be a smart home appliance. For example, the smart home appliance may include at least one of a television, a Digital Video Disk (DVD) player, an audio, a refrigerator, an air conditioner, a vacuum cleaner, an oven, a microwave oven, a washing machine, an air cleaner, a set-top box, a TeleVision (TV) box (e.g., Samsung HomeSync™, Apple TV™, or Google TV™), a game console, an electronic dictionary, an electronic key, a camcorder, and an electronic photo frame.

According to some embodiments, the electronic device may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sales (POS) of a store.

According to some embodiments of the present invention, the electronic device may include at least one of furniture or a part of a building/structure having a communication function, a digital signage a panel/player, a kiosk, an electronic board, an electronic signature receiving device, a projector, and various measuring equipment (e.g., equipment for a water supply, electricity, gases or radio waves).

An electronic device according to various embodiments of the present invention may be a combination of one or more of above described various devices. An electronic device according to various embodiments of the present invention may also be a flexible device. An electronic device according to various embodiments of the present invention is not limited to the above described devices.

The term "user" used in the description of various embodiments of the present invention may refer to a person who uses an electronic device or a device (for example, an artificial intelligence electronic device) that uses an electronic device.

FIG. 1 is a perspective view of a mirror display according to various embodiments of the present invention.

Referring to FIG. 1, a mirror display 100 includes a housing 102, a stand 104, a lighting 106, a mirror 108, and a display 110. The lighting 106, the mirror 108, and the display 110 are included in the housing 102. The lighting 106 is disposed around the mirror 108. In the present example, the lighting 106 is disposed at a circumference of the mirror 108. The housing 102 is supported by the stand 104. The lighting 106 may be implemented by a Light Emitting Diode (LED), or a lamp, such as a Cold Cathode Florescent Lamp (CCFL) or an External Electrode Fluorescent Lamp (EEFL). The mirror 108 is a one-way mirror. A screen of the display 110 may have the same size as a size of the entire mirror 108 or a size corresponding to a size of a part of the mirror 108.

Figure 2:
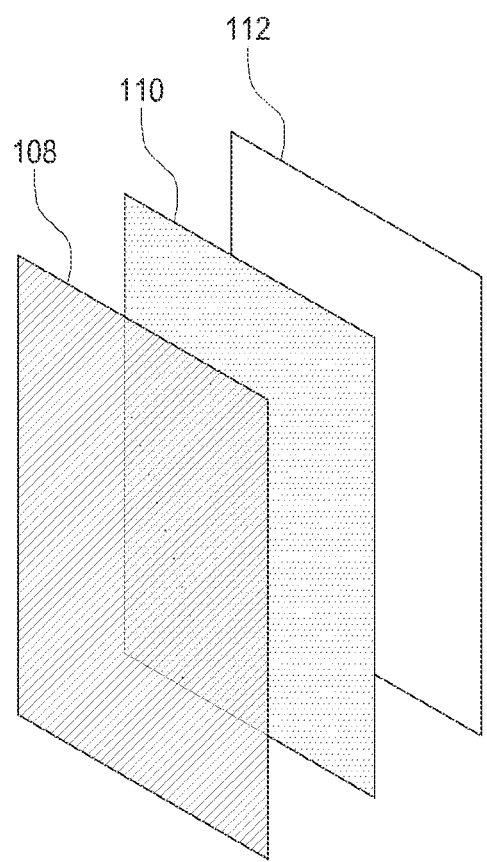
FIG. 2 is a layout diagram illustrating a one-way mirror and a display of the mirror display according to various embodiments of the present invention.

FIG. 2 is a layout diagram of a one-way mirror and a display of mirror display according to various embodiments of the present invention.

Referring to FIG. 2, a front surface for providing a screen of the display 110 is disposed on a rear surface of the mirror 108. The mirror 108 may be implemented by spray-depositing aluminum or chrome on the front surface of the display 110. A Printed Circuit Board (PCB) 112 including a circuit unit of the mirror display 110 may be disposed on a rear surface of the display 110.

Figure 3:
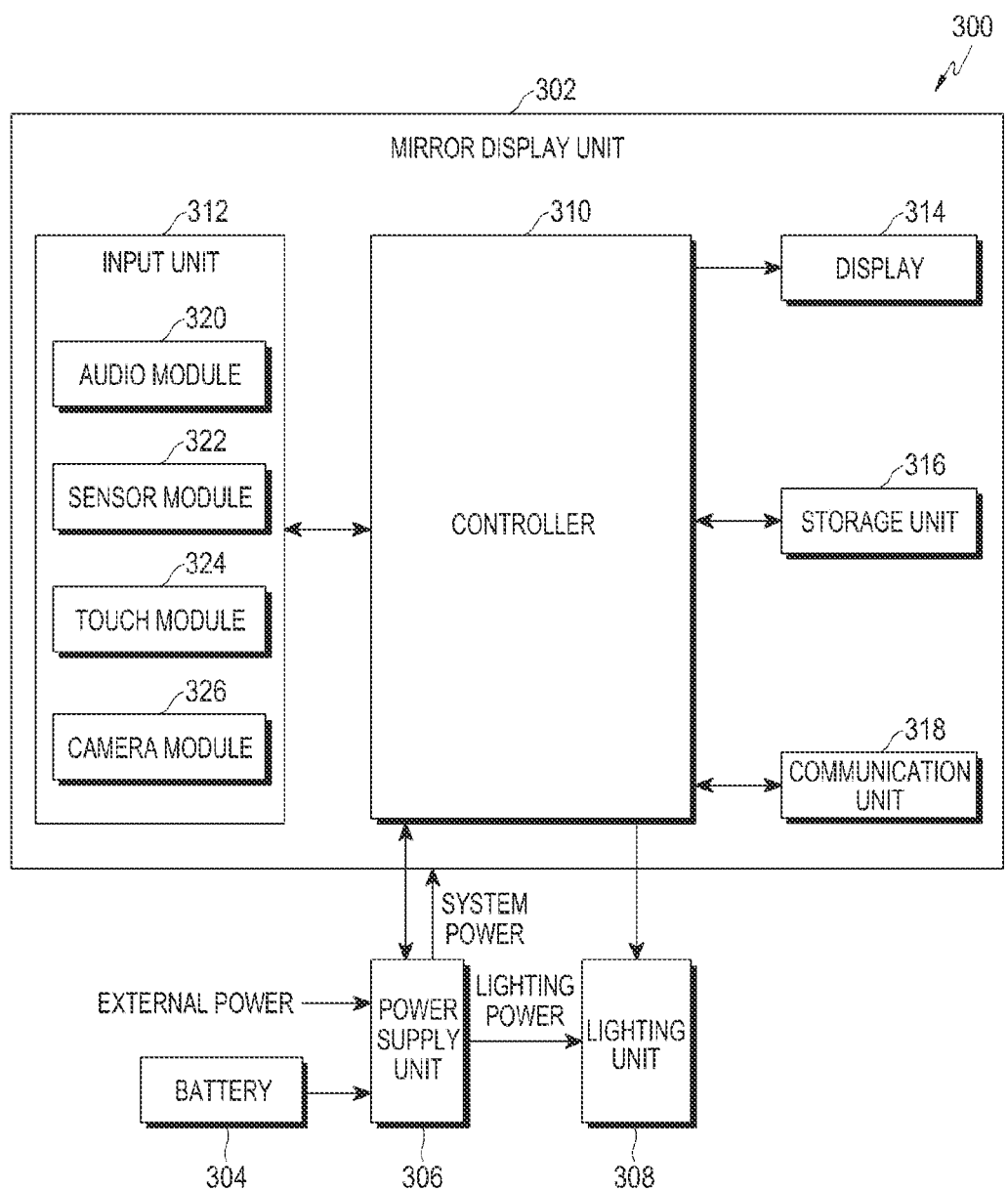
FIG. 3 is a block diagram illustrating an electronic device according to various embodiments of the present invention.

FIG. 3 is a block diagram of an electronic device 300 according to various embodiments of the present invention.

Referring to FIG. 3, the electronic device 300 includes a mirror display unit 302, a battery 304, a power supply unit 306, and a lighting unit 308. The electronic device 300 may be the mirror display 100 of FIG. 1.

The mirror display unit 302 performs a mirror display function (For example, a smart mirror). The mirror display unit 302 includes a controller 310, an input unit 312, a display unit 314, a storage unit 316, and a communication unit 318.

The controller 310 controls one or more other elements, for example, the input unit 312, the display 314, the storage unit 316, the communication unit 318, the power supply unit 306, and the lighting unit 308, of the electronic device 300. The controller 310 executes calculation or data processing on at least one of the control of one or more other elements, such as the input unit 312, the display 314, the storage unit 316, the communication unit 318, the power supply unit 306, and the lighting unit 308, of the electronic device 300, and communication. The controller 310 may include one or more processor or a Micro Controller Unit (MCU). The controller 310 may further include a memory.

The input unit 312 includes an audio module 320, a sensor module 322, a touch module 324, and a camera module 326.

The audio module 320 may bilaterally convert sound and an electronic signal. The audio module 320 may process sound information input or output through, for example, a speaker, a receiver, earphones, or a microphone. The audio module 320 includes a codec for processing a voice signal.

The sensor module 322 may include, for example, a gesture sensor, a gyro sensor, a pressure sensor, a magnetic sensor, an acceleration sensor, a grip sensor, a proximity sensor, a Red, Green, Blue (RGB) sensor, a biometric sensor, a temperature/moisture sensor, an illumination sensor, an Ultra Violet (UV) sensor, and a Passive Infrared (IR) sensor. The sensor module 322 measures a physical quantity or detects an operation state of the electronic device 300, and converts the measured or detected information into an electronic signal. Additionally or alternatively, the sensor module 322 may include, for example, an olfactory sensor (E-nose sensor), an ElectroMyoGraphy (EMG) sensor, an ElectroEncephaloGram (EEG) sensor, an ElectroCardioGram (ECG) sensor, or a fingerprint sensor. The sensor module 322 may further include a control circuit for controlling one or more sensors included therein.

The touch module 324 receives a touch input from a user. The touch module 324 includes a touch panel for recognizing a touch input through at least one scheme among, for example, a capacitive scheme, a resistive scheme, an infrared scheme, and an ultrasonic wave scheme. Further, the touch module 324 may also further include a controller. The touch module 324 may include a capacitive-type touch panel that may recognize, not only physical contact, but also proximity. The touch module 324 may further have a tactile layer function. In this case, the touch module 324 may provide a tactile reaction to a user.

The camera module 326 may photograph images and/or video. According to an embodiment of the present invention, the camera module 326 may provide information regarding a situation external to the electronic device 300 through photographing, and provide the controller 310 with data in accordance with recognition of a state of a user. According to an embodiment of the present invention, the camera module 326 may include one or more image sensors (e.g., a front sensor or a rear sensor), a lens, an Image Signal Processor (ISP), or a flash (for example, a Light Emitting Diode (LED) or a xenon lamp).

The display 314 may be the same as or similar to the display 110 of FIGS. 1 and 2. A front surface for providing a screen of the display 314 may be disposed on a rear surface of the mirror 108. The display 314 may include a display panel, such as a Liquid Crystal Display (LCD), a Plasma Display Panel (PDP), or an Organic Light Emitting Diode (OLED), in which a plurality of pixels is arranged, and a Display Driver Integrated circuit (DDI) for operating the display panel. The display panel 314 may provide a full display for activating a pixel area of the entire panel or a partial display for activating a specific pixel area of the panel.

The storage unit 316 may store a program or data for executing, by the controller 310, a control of the electronic device 300. The storage unit 316 may store image data captured by the camera module 326, and also store image data displayed on the display 314. The storage unit 316 may include an internal memory or an external memory. The internal memory may include at least one of a volatile memory, for example, a Dynamic Random Access Memory (DRAM), a Static RAM (SRAM), and a Synchronous Dynamic RAM (SDRAM), or a non-volatile memory, for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory. According to an embodiment of the present invention, the internal memory may be a Solid State Drive (SSD). The external memory may further include a flash drive, for example, a Compact Flash (CF), a Secure Digital (SD), a Micro Secure Digital (Micro-SD), a Mini Secure Digital (Mini-SD), an eXtreme Digital (xD), or a memory stick. The external memory may be functionally connected with the electronic device 300 through various interfaces. The electronic device 300 may further include a storage device (or storage medium), such as a hard disk drive.

The communication unit 318 may include a wired communication module, such as a Universal Serial Bus (USB), and a wireless communication module, such as a Wi-Fi module, a Bluetooth module, a ZigBee module, a Z-wave module, and an ANT+ module. The wireless communication module may include a network interface (e.g., a Local Area Network (LAN) card), a modem, or the like for connecting the electronic device 300 with a network (e.g., Internet, a LAN, a Wide Area Network (WAN), a communication network, a cellular network, a satellite network, or a Plain Old Telephone Service). The electronic device 300 may receive information from an external electronic device set as a host, or transmit information to an external electronic device set as a host through the communication unit 318.

The power supply unit 306 may receive input of external power through a power supply cable (not shown) or a battery power from the battery 304. The power supply unit 306 may selectively use one of the external power and the battery power according to whether the external power is input, and provide operation power of the electronic device 300. When the external power is input, the power supply unit 306 may generate the operation power of the electronic device 300 using the external power, and when the external power is not input, the power supply unit 306 may generate the operation power of the electronic device 300 using the battery power. The external power may be commercial power. The battery 304 may also be included in the power supply unit 306. Herein, operation power for operating the lighting unit 308 may be referred to as "lighting power", and operation power for operating elements other than the light unit 308 (e.g., the mirror display unit 302) may be referred to as "system power". The power supply unit 306 may charge the battery 304 by generating charging power using the external power.

According to an embodiment of the present invention, when the power supply cable is not connected to the power supply unit 306, the battery power may be used only as the lighting power for operating the lighting unit 308. According to another embodiment of the present invention, even when the power supply cable is not connected to the power supply unit 306, the battery power may be used as the system power for operating other elements, other than the lighting unit 308, as well as the lighting power, when the residual capacity of the battery is sufficient.

The lighting unit 308 may include lighting (e.g., the lighting 106 of FIG. 1). The lighting unit 308 may cause the mirror 108 to appear brighter by increasing luminance around the mirror 108. The lighting unit 308 may also be used as a mood lamp or a guiding lamp. According to an embodiment of the present invention, the lighting unit 308 may also include a circuit for directly applying the input power to the lighting 106. According to another embodiment of the present invention, the lighting unit 308 may include a Direct Current to Direct Current (DC-DC) converter, such as a switching regulator, and also apply input power to the lighting unit 106 through the DC-DC converter. A step-up or step-down switching regulator may be used as the switching regulator. According to yet another embodiment of the present invention, the lighting unit 308 may include a linear regulator, such as a Low DropOut (LDO), and also apply input power to the lighting unit 106 through the linear regulator.

According to various embodiments of the present invention, the lighting unit 308 may be operated by an input of a microphone included in the audio module 320 or a passive InfraRed (IR) sensor or a proximity sensor included in the sensor module 322. According to another embodiment of the present invention, the lighting unit 308 may be operated through an external electronic device, such as a smart phone, a Machine-to-Machine (M2M) gateway, and a remote controller, which may be connected with the communication unit 318 to establish communication.

According to various embodiments of the present invention, operations of the electronic device 300 may be divided into operations performed when the external power is input and operations performed when the external power is not input.

When the external power is input, the electronic device 300 may perform both a mirror display function, such as a smart mirror, and a lighting function. When the external power is input through the power supply cable, the electronic device 300 may be turned on or turned off by a power key. When the electronic device 300 is turned on by the power key, the electronic device 300 may perform a system initialization and enter an idle state capable of performing the mirror display function.

According to various embodiments of the present invention, when a person is detected through the passive IR sensor included in the sensor module 322, the controller 310 may confirm information about a user located in front of the mirror 108 by operating a camera of the camera module 326, through a Bluetooth Low Energy (BLE) beacon signal provided by the communication unit 318, or by recognizing a voice through a microphone (not shown) of the audio module 320. When the information about the user is confirmed, the controller 310 may automatically execute information linked with an application, such as a mirror manager, installed in an external electronic device (for example, a smart phone) of the user. The mirror manager may provide a function for selecting and storing information (e.g., time, weather, personal call records, schedule, health information, and news) necessary to the user.

According to an embodiment of the present invention, the controller 310 determines whether the lighting unit 308 is operated. According to another embodiment of the present invention, a manipulation of the power key by the user determines whether the lighting unit 308 is operated.

According to various embodiments of the present invention, the controller 310 may control whether to operate the lighting unit 308 based on at least one of a user's setting, a user input, user proximity, surrounding luminance, and a control command of the external electronic device. According to an embodiment of the present invention, the lighting unit 308 may be turned on or turned off according to a user input through the touch module 320 or a control command of the external electronic device connectable through the communication unit 318. According to another embodiment of the present invention, the lighting unit 308 may be set to be always turned on or turned off while the mirror display function is performed, according to a user input through the touch module 324 or a control command of the external electronic device connectable through the communication unit 318. The user input may include voice recognition through the audio module 320, and gesture recognition through the sensor module 322, the touch module 324, or the camera module 326. According to another embodiment of the present invention, the lighting unit 308 may also be set to be turned on when a luminance value detected through the luminance sensor of the sensor module 322 is smaller than a specific luminance value, and the lighting unit 308 may also be set to be turned off when a luminance value detected through the luminance sensor of the sensor module 322 is at least equal to the specific luminance value. According to another embodiment of the present invention, the lighting unit 308 may also be set to be turned on when proximity of the user is detected through the proximity sensor of the sensor module 322, and the lighting unit 308 may also be set to be turned off when proximity of the user is not detected through the proximity sensor of the sensor module 322. The controller 310 may determine whether to operate the lighting unit 308 according to the various embodiments of the present invention.

When the external power is not input, only the lighting unit 308 may be turned on using the battery power charged in the battery 304. Reasons for refraining from using the battery power as the entire system power, and using the battery power only as the lighting power for operating the lighting unit 308 are described herein below.

For example, when display 314 has a large size, for example, 14 inches or more, an auxiliary electrode is necessary, and it may be impossible to provide driving power with a small battery, such as a lithium-ion or lithium-polymer battery, used in a mobile device. Taking this into account, including a battery, such as a battery for a vehicle, in the electronic device 300 may be considered, but it may be difficult to commercialize the battery due to design limitations, an increase in manufacturing costs or size, and the like.

Further, the user of the electronic device 300 may use only a mirror function without using the mirror display function in certain situations. When the user uses only the mirror function of the electronic device 300, the user may move while holding the electronic device 300. However, when the electronic device 300 uses external power, such as commercial power, mobility of the electronic device 300 may be limited. An example of the case where the user moves the electronic device 300 is described as follows. For example, when the user desires to quickly use a mirror preparing to go to work, the electronic device 300 is laid on a dressing table, and another person first uses the dressing table, the user may hurriedly move the electronic device 300 to a different location and use the electronic device 300 as a mirror while applying makeup. In this case, user customized information that is a basic function of the mirror display may not be necessary, but it may be important to create an environment in which the user may clearly look into the mirror. For example, the electronic device 300 including the lighting unit 308, which lights up a region around the mirror to enable the user to look into the mirror more clearly, may be useful. The lighting may consume less power than the display, so that the lighting may be sufficiently operated with battery power. As described above, when the electronic device 300 is used as the mirror, the electronic device 300 is lit with the battery power without connecting the electronic device 300 to the power supply cable for inputting the external power, thereby improving mobility and usability of the electronic device 300.

Figure 4:
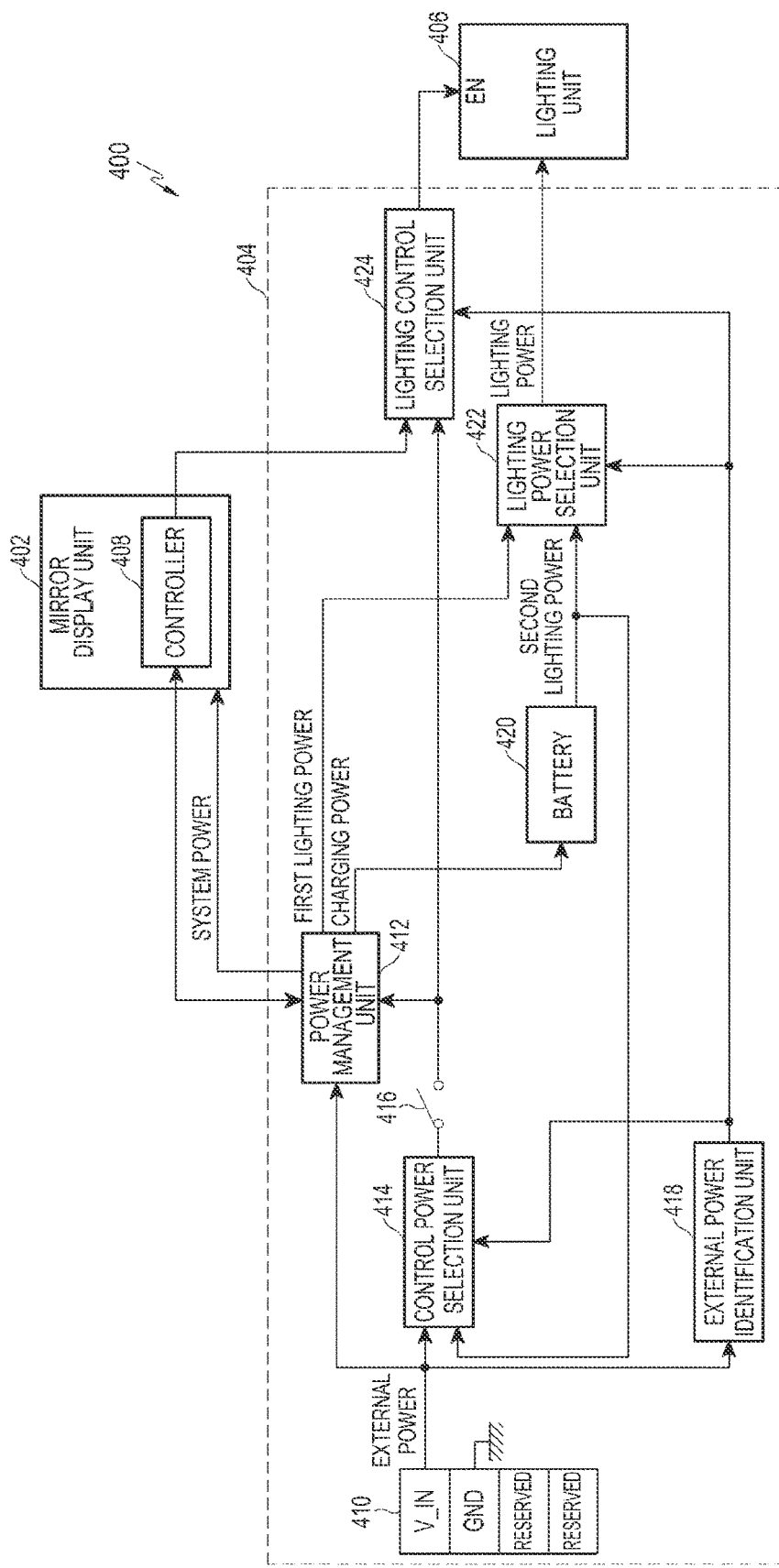
FIG. 4 is a detailed block diagram illustrating an electronic device according to an embodiment of the present invention.

FIG. 4 is a detailed block diagram of an electronic device according to an embodiment of the present invention.

Referring to FIG. 4, an electronic device 400 includes a mirror display unit 402, a power supply unit 404, and a lighting unit 406. The electronic device 400 may be configured in a manner that is the same or similar to that of the electronic device 300 of FIG. 3. The mirror display unit 402, the power supply unit 404, and the lighting unit 406 may be configured the same or similarly to the mirror display unit 302, the power supply unit 306, and the lighting unit 308 of FIG. 3, respectively. The mirror display unit 402 includes a controller 408. The controller 408 may be the same or similar to the controller 310 of FIG. 3.

The power supply unit 404 includes a connector 410, a power management unit 412, a control power selection unit 414, a power key 416, an external power identification unit 418, a battery 420, a lighting power selection unit 422, and a lighting control selection unit 424.

The connector 410 may be connected to a power supply cable (not shown). The connector 410 includes a power input terminal V_IN, a ground terminal GND, and at least one reserved terminal. The connector 410 may receive input the external power from the power supply cable through the power input terminal V_IN and the ground terminal GND. The reserved terminals may be variously used as necessary. For example, the reserved terminals may be utilized as an IDentification (ID) terminal for identifying whether the power supply cable is connected to the connector 410 and the like.

When the external power input through the connector 410 is Alternating Current (AC) power, the power supply unit 404 may further include a transformer for converting AC power to Direct Current (DC) power. The power supply unit 404 may include an Over-Voltage Protection (OVP) circuit for protecting a system. The DC external power input through the connector 410 or the DC external power converted from the AC external power input through the connector 410 may be applied to the power management unit 412, the control power selection unit 414, and the external power identification unit 418 through the OVP circuit. According to an embodiment of the present invention illustrated in FIG. 4, the power supply unit 404 which does not include a transformer, and the OVP is not illustrated.

The power management unit 412 manages of the power of the electronic device 400. Although not illustrated, the power management unit 412 may include, for example, a Power Management Integrated Circuit (PMIC), a charger Integrated Circuit (IC), or a battery gauge. The power management unit 412 generates lighting power for operating the lighting 406 using the external power. Herein, the lighting power generated using the external power by the power management unit 412 may be referred to as "first lighting power". The power management unit 412 generates charging power for charging the battery 420 using the external power. The power management unit 412 generates system power for operating other elements, for example, the mirror display unit 402, of the electronic device 400 using the external power. The power management unit 412 may initiate an operation when a power control signal applied to the power key 416 is in an on-state. The power management unit 412 is controlled by the controller 408.

The power supply unit 404 may also include a discrete IC chip, such as a linear regulator including a Low-DropOut regulator (LDO), and a DC-DC converter including a switching regulator, for supplying power to each element of the electronic device 400, instead of the power management unit 412.

The battery power of the battery 420 may be provided as the light power for operating the lighting unit 406. Herein, the lighting power provided from the battery 420 may be referred to as "second lighting power". The battery 420 may be charged by the power management unit 412. The power supply unit 404 may include a separate discrete charging IC for charging the battery 420, instead of the power management unit 412.

The external power identification unit 418 identifies whether the external power is input through the connector 410. The external power identification unit 418 may be configured in a manner similarly to, for example, the example of FIG. 5 or 6, which is described herein below, and may be variously configured using a combination of various logic circuits used in the technical field to which the embodiments present invention pertain or a circuit, such as a comparator.

Figure 5:
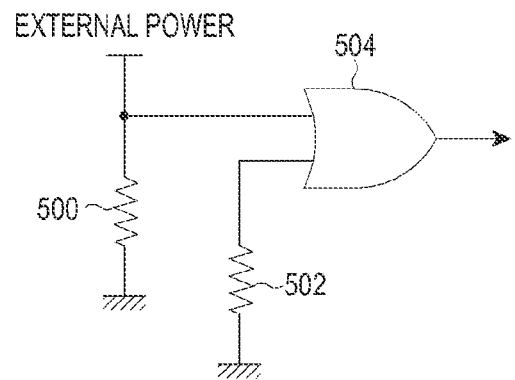
FIG. 5 is a circuit diagram illustrating an external power identification unit according to an embodiment of the present invention.

FIG. 5 is a circuit diagram of an external power identification unit according to an embodiment of the present invention.

Referring to FIGS. 4 and 5, according to an embodiment of the present invention, the external power identification unit 418 includes two resistors 500 and 502 and an OR gate 504. The resistor 500 is connected between the external power and a ground. One of the two input terminals of the OR gate 504 is connected to a connection point between the external power and the resistor 500, and the other input terminal of the OR gate 504 is connected to the ground through the resistor 502.

When the external power is input, the OR gate 504 outputs a logic "high" signal, and when the external power is not input, the OR gate 504 outputs a logic "low" signal.

Figure 6:
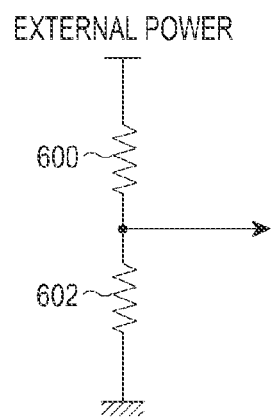
FIG. 6 is a circuit diagram illustrating an external power identification unit according to another embodiment of the present invention.

FIG. 6 is a circuit diagram of an external power identification unit according to another embodiment of the present disclosure.

Referring to FIGS. 4 and 6, according to another embodiment of the present invention, the external power identification unit 418 includes two resistors 600 and 602 serially connected between the external power and the ground. When the external power is input, a logic "high" signal is output from a connection point of the resistors 600 and 602, and when the external power is not input, a logic "low" signal is output from a connection point of the resistors 600 and 602.

Referring back to FIG. 4, the external power identification unit 418 outputs, for example, different logic signals according to whether the external power is input, such as described with reference to FIGS. 5 and 6. For example, when external power is input, the external power identification unit 418 may output the logic "high" signal, and when external power is not input, the external power identification unit 418 may output the logic "low" signal.

The control power selection unit 414 applies one of the external power and the battery power to the power key 416 according to whether the external power is input identified by the external power identification unit 418. When it is identified that the external power is input, the control power selection unit 414 selects the external power and apply the selected external power to the power key 416. When it is identified that the external power is not input, the control power selection unit 414 selects the battery power and applies the selected battery power to the power key 416.

The power key 416 is manipulated by a user to generate a power control signal. When the power key 416 is switched into the on-state, the external power or the battery power applied from the power selection unit 414 is output. Accordingly, when the power key 416 is switched into the on-state, the power control signal output from the power key 416 may be the logic "high" signal. According to an embodiment of the present invention, the power key 416 may be a maintained-type push button switch, of which an on-state and an off-state are toggled whenever the button is pushed, and the toggled state is maintained until the switch is pushed again. According to another embodiment of the present invention, the power key 416 may be an automatic recovering-type push button switch, which remains on while the switch is pushed, and turns off when the push is released. When the maintained type push button switch is used as the power key 416, a circuit, which allows an on-state and an off-state of the power control signal to be toggled whenever the power key 416 is pushed, and the toggled state to be maintained until the power key 416 is pushed next. The circuit may be implemented by an Application-Specific Integrated Circuit (ASIC) chip based on hardware or a dedicated chip in a level of a microcomputer used in the technical field to which the present invention pertains.

The lighting power selection unit 422 applies one of the first lighting power generated by the power management unit 412 and the second lighting power provided from the battery 420 to the lighting unit 406 as the lighting power according to whether the external power identification unit 418 identifies that the external power is input. When the external power identification unit 418 identifies that the external power is input, the lighting power selection unit 422 selects the first lighting power and applies the selected first lighting power to the lighting unit 406 as the lighting power. When the external power identification unit 418 identifies that the external power is not input, the lighting power selection unit 422 selects the second lighting power and applies the selected second lighting power to the lighting unit 406 as the lighting power.

The lighting unit 406 is operated by the lighting power applied from the lighting power selection unit 422 to turn on the lighting (for example, the lighting 106 of FIG. 1). The lighting unit 406 may include a stabilization circuit (for example, a linear regulator, such as an LDO, or a DC-DC converter, such as a switching regulator) capable of stably transmitting the lighting power to the lighting 106. The lighting unit 406 includes an enable terminal EN capable of controlling whether to operate the lighting unit 406 according to an external operation.

The lighting control selection unit 424 connects one of the controller 408 and the power key 416 to the enable terminal EN of the lighting unit 406 according to whether the external power is input identified by the external power identification unit 418. When the external power identification unit 418 identifies that the external power is input, the lighting control selection unit 424 selects the controller 408 and connects the controller 408 to the enable terminal EN of the lighting unit 406. When the external power identification unit 418 identifies that the external power is not input, the lighting control selection unit 424 selects the power key 416 and connects the power key 416 to the enable terminal EN of the lighting unit 406. The controller 408 may include a General Purpose Input Output (GPIO) port. The controller 408 may be connected to the enable terminal EN of the lighting unit 406 through the GPIO port.

Accordingly, when the external power is input, the controller 408 controls whether the lighting unit 406 is operated, and when the external power is not input, the power key 416 controls whether the lighting unit 406 is operated.

Operations of the electronic device 400 when the external power is input and when the external power is not input according to an embodiment of the present invention are described as follows.

First, an operation of the electronic device 400 when the external power is input is described. When the input of the external power is identified by the external power identification unit 418, the control power selection unit 414 selects the external power and applies the selected external power to the power key 416. When the user switches on the power key 416, the external power is output from the power key 416 to the power management unit 412 and the lighting control selection unit 424 as the on-state power control signal. The power management unit 412 initiates the operation by the on-state power control signal and generates the operation power of the electronic device 400. The operation power generated by the power management unit 408 may also include the first lighting power. The lighting power selection unit 422 selects the first lighting power generated by the power management unit 412 and applies the selected first lighting power to the lighting unit 406 as the lighting power. When the external power identification unit 418 identifies that the external power is input, the lighting control selection unit 424 selects the controller 408 and connects the controller 408 to the enable terminal EN of the lighting unit 406. Accordingly, the controller 408 controls whether the lighting unit 406 is operated. Accordingly, when the external power is input, the lighting unit 406 is operated by the controller 408 and turns on the lighting 106 using the first lighting power applied as the lighting power.

Second, an operation of the electronic device 400 when the external power is not input is described as follows. When the non-input of the external power is identified by the external power identification unit 418, the control power selection unit 414 selects the battery power and applies the selected battery power to the power key 416. When the user switches on the power key 416, the battery power is output from the power key 416 to the power management unit 412 and the lighting control selection unit 424 as the on-state power control signal. Even though the on-state power control signal is applied to the power management unit 412, the external power is not input to the power management unit 412, so that the power management unit 412 is not operated. Accordingly, the system power is not applied to the mirror display unit 402 including the controller 408. The lighting control selection unit 424 connects the power key 416 to the enable terminal EN of the lighting unit 406. Accordingly, the power key 416 controls whether the lighting unit 406 is operated. Accordingly, when the external power is not input, even though the power management unit 412 is not operated, the lighting unit 406 may be operated by the power key 416 to turn on the lighting 106 using the second lighting power applied as the lighting power.

Accordingly, an electronic device according to various embodiments of the present invention may perform at least one function, such as lighting, even though not connected to the external power, thereby improving mobility and usability. Further, it is possible to automatically select one of external power and the battery power according to whether the external power is input so that the selected power is used as the lighting power, thereby efficiently managing the battery power.

A method of controlling the mirror display according to various embodiments of the present invention may include identifying whether external power is input, and providing operation power of the mirror display by selectively using one of the external power and the battery power according to whether the external power is input.

The provision of the operation power of the mirror display may include applying lighting power generated from one of the external power and the battery power according to whether the external power is input to the lighting unit of the mirror display.

The application of the lighting power may include applying lighting power generated from the external power to the lighting unit when the external power is input, and applying lighting power generated from the battery power to the lighting unit when the external power is not input.

A method of controlling the mirror display according to various embodiments of the present invention may further include connecting one of the controller and the power key to the enable terminal of the lighting unit according to whether the external power is input so as to control an operation of the lighting unit.

The connection of one of the controller and the power key to the enable terminal of the lighting unit may include connecting the controller to the enable terminal of the lighting unit when the external power is input, and connecting the power key to the enable terminal of the lighting unit when the external power is not input.

A method of controlling the mirror display according to various embodiments of the present invention may further include controlling, by the controller, whether to operate the lighting unit based on at least one of user setting, a user input, user proximity, surrounding luminance and a control command of an external electronic device.

An electronic device according to various embodiments of the present invention may include a battery, a mirror display unit and a power supply unit. The mirror display unit performs a mirror display function. The power supply unit provides operation power to the mirror display unit by selectively using one of external power and battery power of the battery according to whether the external power is input.

The electronic device may further include a lighting unit, and the power supply unit may include a lighting power selection unit. The lighting power selection unit applies lighting power generated from one of the external power and the battery power to the lighting unit according to whether the external power is input.

The lighting power selection unit applies lighting power generated from the external power to the lighting unit when the external power is input, and applies lighting power generated from the battery power to the lighting unit when the external power is not input.

The power supply unit may further include a lighting control selection unit and a control power selection unit. The lighting control selection unit connects one of a controller of the mirror display unit and a power key of the electronic device to an enable terminal of the lighting unit according to whether the external power is input so as to control an operation of the lighting unit. The control power selection unit may apply one of the external power and the battery power to the power key according to whether the external power is input.

When the external power is input, the lighting power selection unit applies lighting power generated from the external power to the lighting unit, the lighting control selection unit connects the controller to the enable terminal of the lighting unit, and the control power selection unit applies the external power to the power key.

When the external power is not input, the lighting power selection unit applies lighting power generated from the battery power to the lighting unit, the lighting control selection unit connects the power key to the enable terminal of the lighting unit, and the control power selection unit may apply the battery power to the power key.

The controller controls operations of the lighting unit based on at least one of a user setting, a user input, user proximity, surrounding luminance, and a control command of an external electronic device.

Figure 7:
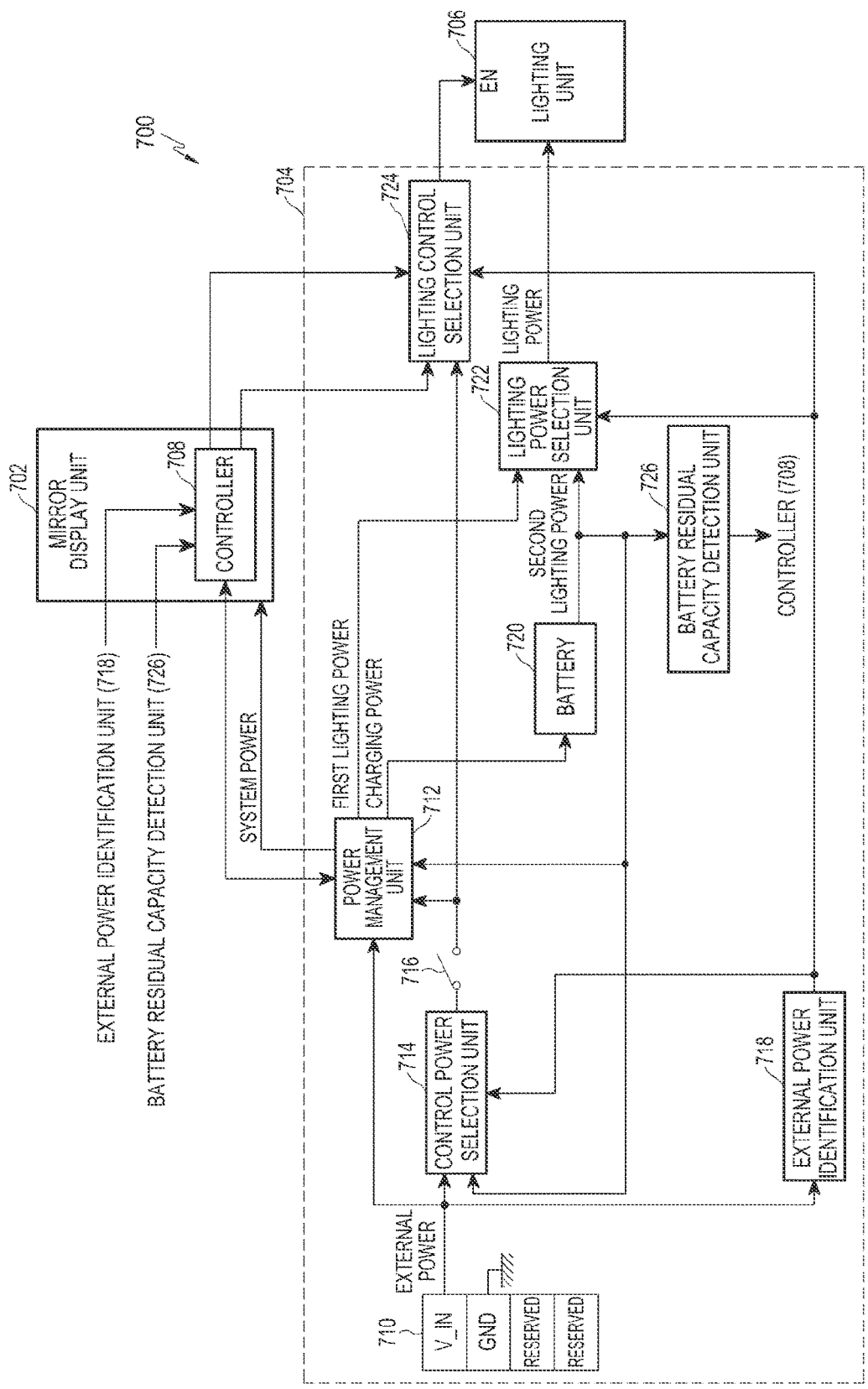
FIG. 7 is a detailed block diagram illustrating an electronic device according to another embodiment of the present invention.

FIG. 7 is a detailed block diagram of an electronic device according to another embodiment of the present invention.

Referring to FIG. 7, an electronic device 700 includes a mirror display unit 702, a power supply unit 704, and a lighting unit 706. The electronic device 700 may be configured in a manner that is the same or similar to that of the electronic device 300 of FIG. 3. The mirror display unit 702, the power supply unit 704, and the lighting unit 706 may be the same or similar to the mirror display unit 302, the power supply unit 306, and the lighting unit 308 of FIG. 3, respectively. The mirror display unit 702 includes a controller 708. The controller 708 may be the same or similar to the controller 310 of FIG. 3.

The power supply unit 704 includes a connector 710, a power management unit 712, a control power selection unit 714, a power key 716, an external power identification unit 718, a battery 720, a lighting power selection unit 722, a lighting control selection unit 724, and a battery residual capacity detection unit 726.

The connector 710, the power management unit 712, the control power selection unit 714, the power key 716, the external power identification unit 718, the battery 720, the lighting power selection unit 722, and the lighting control selection unit 724 may correspond to the connector 410, the power supply management unit 412, the control power selection unit 414, the power key 416, the external power identification unit 418, the battery 420, the lighting power selection unit 422, and the lighting control selection unit 424, respectively. Accordingly, in the following description, descriptions of certain features similar to those already described with reference to FIG. 4 may be omitted for clarity and conciseness.

The power management unit 712 generates operation power of the electronic device 700 from external power, similar to the power management unit 412 of FIG. 4. Battery power, as well as the external power, may be applied to the power management unit 712. When the external power is input, the power management unit 712 is operated by the external power, and when the external power is not input, the power management unit 712 is operated by the battery power, to generate power of the electronic device 700.

The battery residual capacity detection unit 726 detects a battery residual capacity from the battery power, similar to a battery gauge (not shown), which may be included in the power management unit 712, and provides the detected battery residual capacity to the controller 708. Accordingly, when the power management unit 712 includes the battery gauge, the battery residual capacity detection unit 726 may be omitted. When the power management unit 712 includes the battery gauge, the battery gauge detects the battery residual capacity from the battery power and provides the detected battery residual capacity to the controller 708.

The lighting control selection unit 724 connects one of the controller 708 and the power key 716 to an enable terminal EN of the lighting unit 708 according to whether the external power is input identified by the external power identification unit 718 and a control of the controller 708. When the external power is input, the lighting control selection unit 724 connects the controller 708 to the enable terminal EN of the lighting unit 706, and when the external power is not input, the lighting control selection unit 724 connects the power key 716 to the enable terminal EN of the lighting unit 706 under the control of the controller 708.

Figure 8:
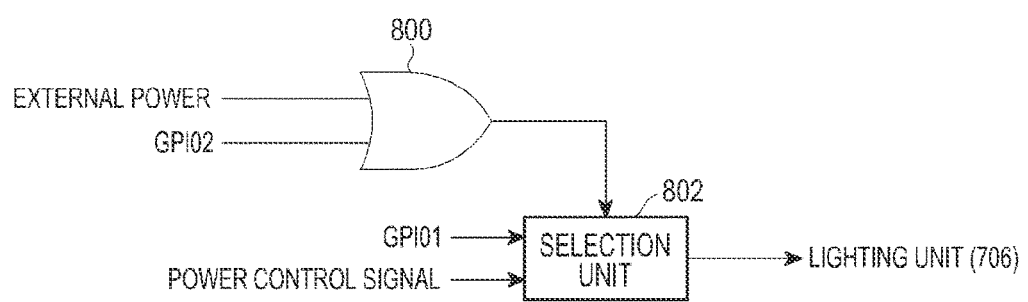
FIG. 8 is a block diagram illustrating a lighting control selection unit according to an embodiment of the present invention.

FIG. 8 is a block diagram illustrating a lighting control selection unit according to an embodiment of the present invention.

Referring to FIG. 8, a lighting control selection unit 724 includes an OR gate 800 and a selection unit 802.

The external power is input into one of the two input terminals of the OR gate 800, and a port GPIO2, which is one of the GPIO ports of the controller 708, is connected to the other one of the two input terminals of the OR gate 800. When the external power is input or a logic "high" signal is input from the controller 708, the OR gate 800 applies the logic "high" signal to the selection unit 802. When the external power is not input or the logic "high" signal is not input from the controller 708, the OR gate 800 applies a logic "low" signal to the selection unit 802.

The selection unit 802 selects a power control signal output from the power key 716 or a port GPIO1, which is one of the GPIO ports of the controller 708, according to the output signal of the OR gate 800, and connects the selected one to the enable terminal EN of the lighting unit 706. When the output signal of the OR gate 800 is the logic "high" signal, the selection unit 802 selects the GPIO1 of the controller 708, and connects the selected port GPIO1 to the enable terminal EN of the lighting unit 706. Accordingly, when the external power is input, or when the external power is not input, but the controller 708 is operated by the battery power, the operation of the lighting unit 706 is controlled by the controller 708. When the output signal of the OR gate 800 is the logic "low" signal, the selection unit 802 selects the power key 716, and connects the selected power key to the enable terminal EN of the lighting unit 706. Accordingly, when the external power is not input and the controller 708 is not operated by the battery power, the operation of the lighting unit 706 is controlled by the power control signal output from the power key 716.

Referring back to FIG. 7, the controller 708 controls the operation of the lighting unit 706, and also controls the power management unit 712 and the lighting control selection unit 724 based on whether the external power identification unit 718 identifies that the external power is input and the battery residual capacity detected by the battery residual capacity detection unit 726. When the external power is not input and the battery residual capacity is less than a specified value that is used to indicate a low residual capacity state, the controller 708 may stop the operation of the display 314 automatically or according to a user's confirmation. For example, the specified value may be set by the user, or by a designer or a manufacturer of the electronic device.

When the battery residual capacity is in the low residual capacity state, the controller 708 may output a low residual capacity notification message. For example, the low residual capacity notification message may be a phrase or a voice notifying that the battery residual capacity is in the low residual capacity state. The controller 708 may output the low residual capacity notification message through the display 314 or the audio module 320. When the battery residual capacity is in the low residual capacity state, the stop of the operation of the display 314 may be selected by the user. When the battery residual capacity is in the low residual capacity state, the controller 708 may stop the power management unit 712 from generating the system power from the battery power. In this case, the operation of the controller 708 may also be stopped.

A power supply unit of an electronic device according to various embodiments of the present invention may include a lighting control selection unit, a control power selection unit and a battery residual capacity detection unit. The lighting control selection unit connects one of the controller and the power key of the electronic device to the enable terminal of the lighting unit according to whether the external power is input and the control of the controller of the mirror display unit so as to control the operation of the lighting unit. The control power selection unit applies one of the external power and the battery power to the power key according to whether the external power is input. The battery residual capacity detection unit detects a battery residual capacity from the battery power.

The controller controls the operation of the lighting unit, and when the external power is not input and the battery residual capacity is less than the specified value that is the low residual capacity state, the controller stops the operation of the display of the mirror display unit.

When the external power is input, the lighting power selection unit applies lighting power generated from the external power to the lighting unit, the lighting control selection unit connects the controller to the enable terminal of the lighting unit, and the control power selection unit applies the external power to the power key.

When the external power is not input, the lighting power selection unit applies lighting power generated from the battery power to the lighting unit, the lighting control selection unit connects the power key to the enable terminal of the lighting unit according to the control of the controller, and the control power selection unit applies the battery power to the power key.

When the battery residual capacity is in the low residual capacity state, the controller outputs the low residual capacity notification message, and when a confirmation on the low residual capacity notification message is input, the controller stops the operation of the display.

Figure 9:
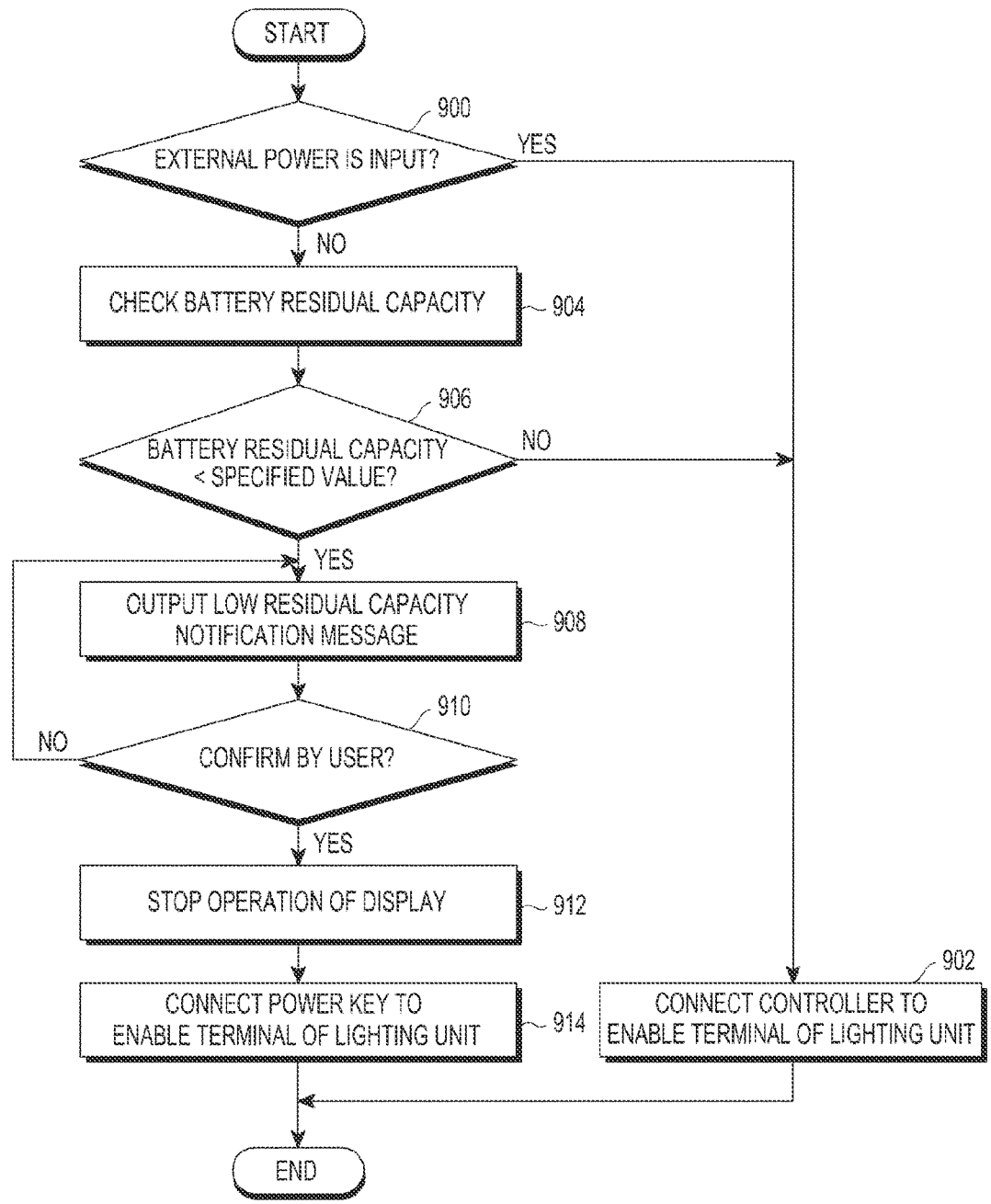
FIG. 9 is a control flowchart illustrating a method according to an embodiment of the present invention.

FIG. 9 is a control flowchart illustrating a method according to an embodiment of the present invention.

Referring to FIGS. 7 and 9, at step 900, the controller 708 determines whether external power is input through the external power identification unit 718.

At step 902, the lighting control selection unit 724 connects the controller 708 to the enable terminal EN of the lighting unit 706, when the external power identification unit 718 identifies that the external power is input at operation 900. In this case, the operation of the lighting unit 706 may be controlled by the controller 708.

At step 904, the controller 708 checks a battery residual capacity through the battery residual capacity detection unit 726, when the external power identification unit 718 identifies that the external power is not input, at step 900.

At step 906, the controller 708 determines whether the battery residual capacity is smaller than a specified value. When controller 708 determines that the battery residual capacity is at least equal to the specified value, at step 906, the power management unit 712 generates system power from the battery power, so that step 902 is performed.

At step 908, the controller 708 outputs the low residual capacity notification message through the display 314 or the audio module 320, when the battery residual capacity is less than the specified value, which indicates a lower residual capacity state, at step 906.

At step 910, the controller 708 waits for a user confirmation while outputting the low residual capacity notification message, at step 908. The user confirmation may be input through the touch module 324 or from an external electronic device of the user through the communication unit 318.

At step 912, the controller 708 stops the operation of the display 314, when the user confirmation on the low residual capacity notification message exists, at step 910.

At step 914, the controller 708 connects the power key 716 to the enable terminal EN of the lighting unit 706 by controlling the lighting control selection unit 724. In this case, the controller 708 stops the operation of the power management unit 712. In this case, the operation of the lighting unit 706 is controlled by the power key 716.

Accordingly, an electronic device may perform at least one function (e.g., lighting) using the battery power even though the electronic device is not connected to the external power, thereby improving mobility and usability. Further, the functions of the electronic device, which are to be executed with the battery power as the operation power, may be selected according to whether the low residual capacity state of the battery, thereby efficiently managing the battery power.

Methods of controlling the mirror display according to various embodiments of the present invention include detecting a battery residual capacity from the battery power, stopping the operation of the display of the mirror display when the external power is not input and the battery residual capacity is smaller than a specified value that is the low residual capacity state, and connecting one of the controller and the power key to the enable terminal of the lighting unit according to whether the external power is input and the low residual capacity state so as to control the operation of the lighting unit.

The connection of one of the controller and the power key to the enable terminal of the lighting unit includes connecting the controller to the enable terminal of the lighting unit when the external power is input or the battery residual capacity is not in the low residual capacity state, and connecting the power key to the enable terminal of the lighting unit when the external power is not input or the battery residual capacity is in the low residual capacity state.

The termination of the operation of the display includes outputting the low residual capacity notification message, and stopping the operation of the display when a confirmation on the low residual capacity notification message is input.

Figure 10:
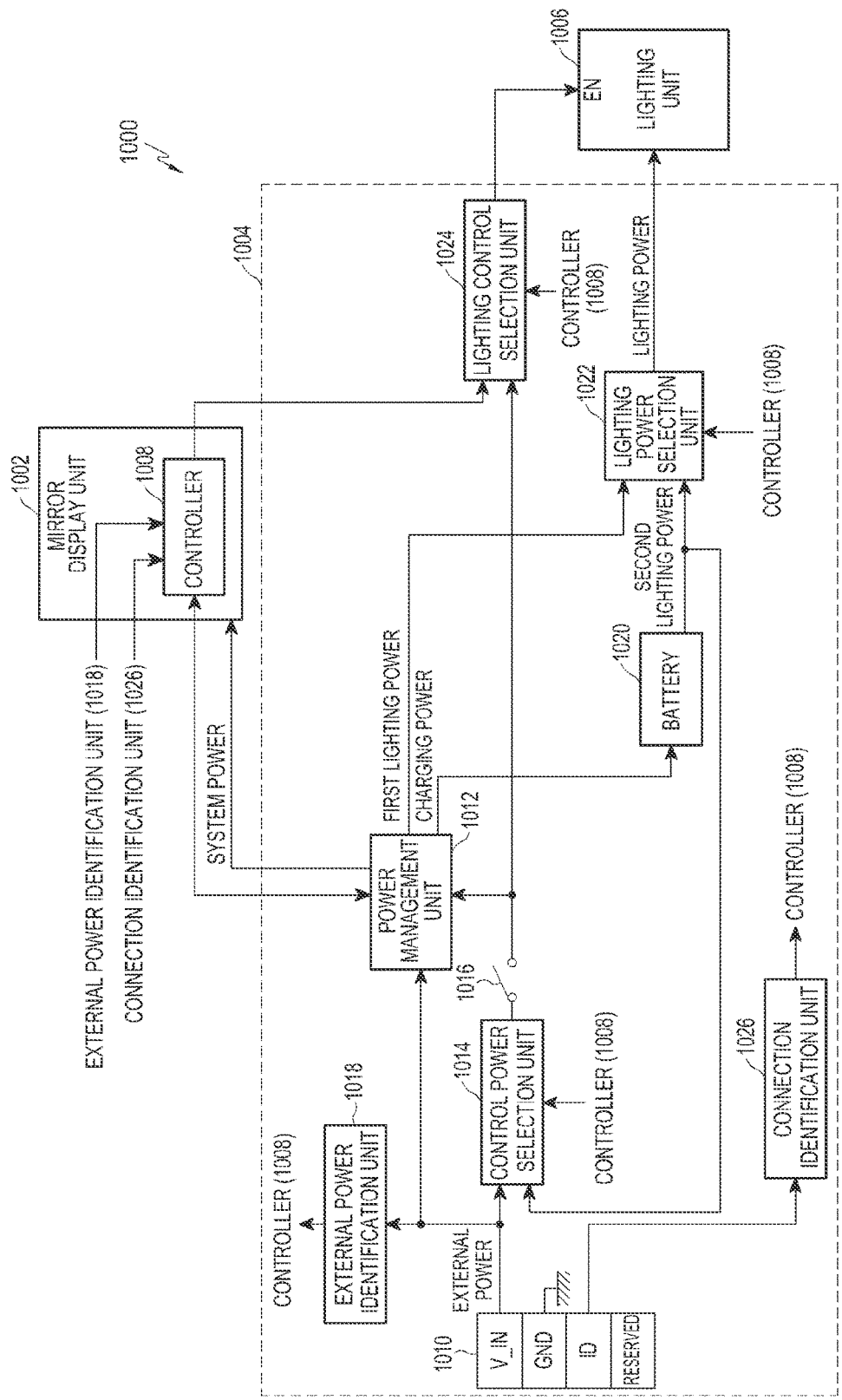
FIG. 10 is a detailed block diagram illustrating an electronic device according to yet another embodiment of the present invention.

FIG. 10 is a detailed block diagram illustrating an electronic device according to another embodiment of the present invention.

Referring to FIG. 10, an electronic device 1000 includes a mirror display unit 1002, a power supply unit 1004, and a lighting unit 1006. The electronic device 1000 may be configured in a manner that is the same or similar to that of the electronic device 300 of FIG. 3. The mirror display unit 1002, the power supply unit 1004, and the lighting unit 1006 may be the same or similar to the mirror display unit 302, the power supply unit 306, and the lighting unit 308 of FIG. 3, respectively. The mirror display unit 1002 includes a controller 1008. The controller 1008 may be the same or similar to the controller 310 of FIG. 3.

The power supply unit 1004 includes a connector 1010, a power management unit 1012, a control power selection unit 1014, a power key 1016, an external power identification unit 1018, a battery 1020, a lighting power selection unit 1022, a lighting control selection unit 1024, and a connection identification unit 1026.

The connector 1010, the power management unit 1012, the control power selection unit 1014, the power key 1016, the external power identification unit 1018, the battery 1020, the lighting power selection unit 1022, and the lighting control selection unit 1024 may correspond to the connector 410, the power supply management unit 412, the control power selection unit 414, the power key 416, the external power identification unit 418, the battery 420, the lighting power selection unit 422, and the lighting control selection unit 424, respectively. Accordingly, in the following description, overlapping descriptions of elements already described with reference to FIG. 4 are omitted for clarity and conciseness.

The connector 1010 includes a power input terminal V_IN, a ground terminal GND, an ID terminal "ID", and a reserved terminal. The ID terminal identifies whether a power supply cable (not shown) is connected to the connector 1010.

The connection identification unit 1026 determines whether the power supply cable is connected to the connector 1010, and provides a result of the identification unit to the controller 1008.

Figure 11:
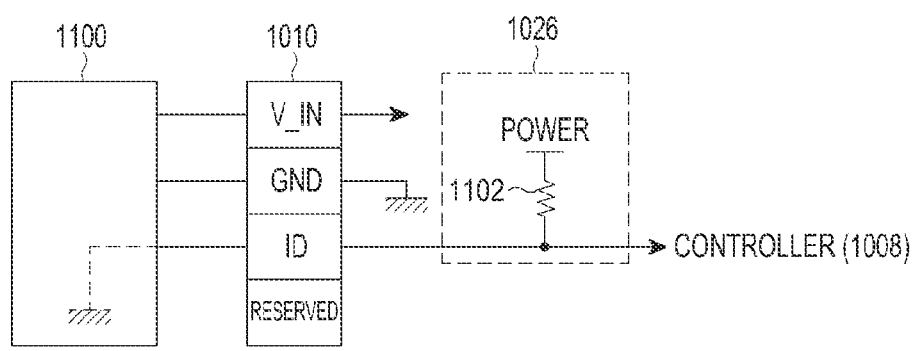
FIG. 11 is a circuit diagram illustrating a connection identification unit according to an embodiment of the present invention.

FIG. 11 is a circuit diagram illustrating a connection identification unit according to an embodiment of the present invention.

Referring to FIGS. 10 and 11, according to an embodiment of the present invention, the connection identification unit 1026 includes a resistor 1102 connected between an ID terminal "ID" of the connector 1010 and a power supply. A connector 1100 of the power supply cable may be connected to the connector 1010. A terminal of the connector 1100 connected to the ID terminal ID of the connector 1010 may be connected to the ground.

When the connector 1100 is not connected to the connector 1010, the connection identification unit 1026 outputs a logic "high" signal by a power voltage to the controller 1008. When the connector 1100 is connected to the connector 1010, the connection identification unit 1026 outputs a logic "low" signal provided by the ground of the connector 1100.

Referring back to FIG. 10, the control power selection unit 1014, the lighting power selection unit 1022, and the lighting control selection unit 1024 are controlled by the controller 1008.

The control power selection unit 1014 applies the external power or the battery power to the power key 1016 under the control of the controller 1008.

The lighting power selection unit 1022 applies first lighting power or second lighting power to the lighting unit 1006 as lighting power under the control of the controller 1008.

The lighting control selection unit 1024 connects the controller 1008 or the power key 1016 to the enable terminal EN of the lighting unit 1006 under the control of the controller 1008.

When the external power identification unit 1018 identifies that the power supply cable is connected to the connector 1010 while the electronic device 1000 is in a battery power operation state, the controller 1008 outputs a confirmation request message. When a confirmation in response to the confirmation request message is input from a user, and the power identification unit 1018 identifies that the external power is input, the controller 1008 switches the electronic device 1000 into an external power operation state by controlling the power management unit 1012, the control power selection unit 1014, the lighting power selection unit 1022, and the lighting control selection unit 1024. The battery power operation state is a state in which the electronic device 1000 is operated using the battery power of the battery 1020 as described with reference to FIG. 7. The external power operation state is a state in which the electronic device 1000 is operated using the external power as described with reference to FIG. 7. For example, the confirmation request message may be a phrase or a voice for requesting a confirmation on the connection of the external power. The controller 1008 may output the confirmation request message through the display 314 or the audio module 320. The confirmation of the user on the confirmation request message may be input through, for example, the touch module 324, or an external electronic device of the user connected through the communication unit 318.

A power supply unit of the electronic device according to various embodiments of the present invention may include a connector and a connection identification unit. The connector is connected to the power supply cable to receive the external power through the power supply cable. The connection identification unit identifies whether the power supply cable is connected to the connector. The controller of the mirror display unit outputs the confirmation request message when the power supply cable is connected to the connector while the power supply unit is in the battery power operation state, and switches the power supply unit into the external power operation state when a confirmation on the confirmation request message is input and the external power is input.

Figure 12:
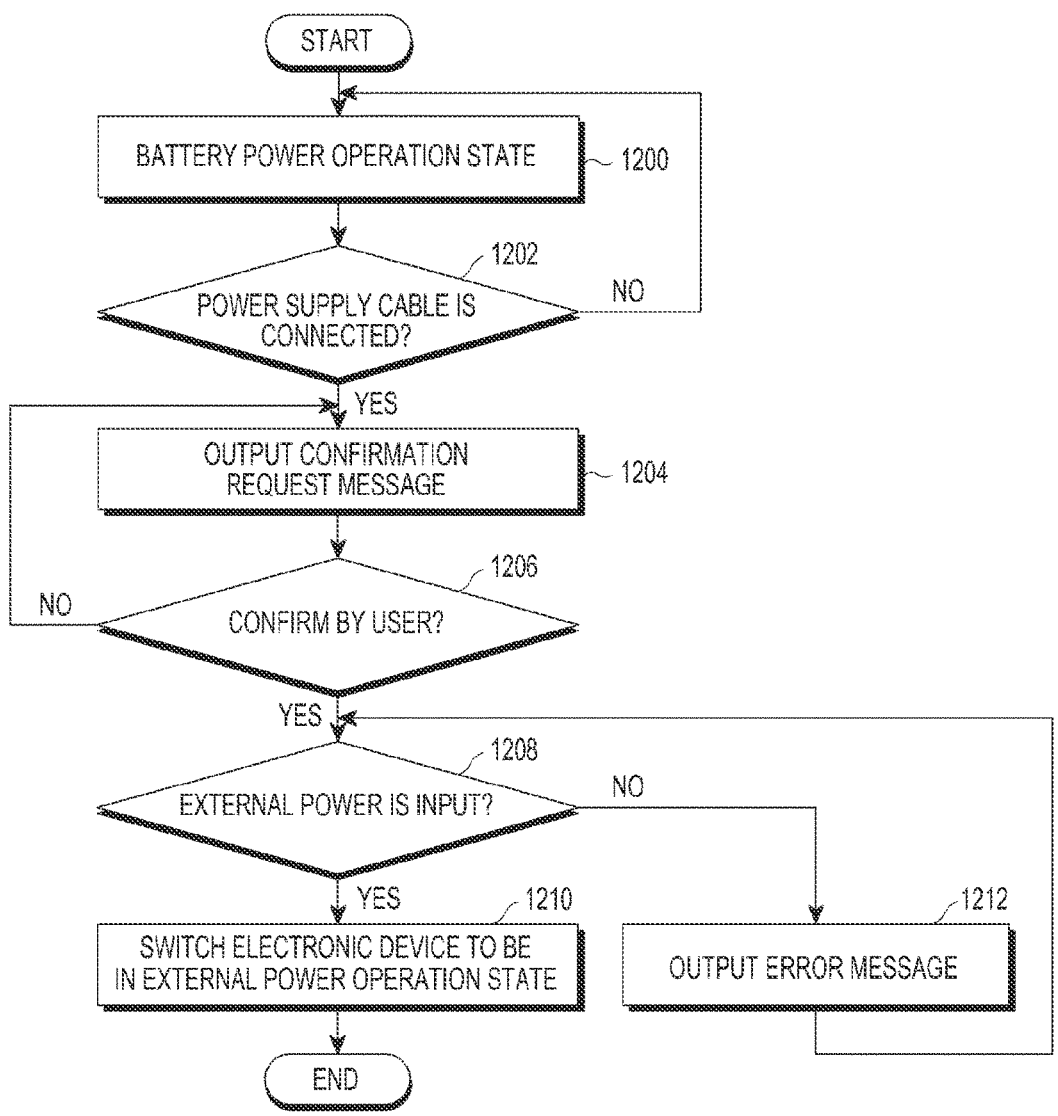
FIG. 12 is a control flowchart illustrating a method according to another embodiment of the present invention.

FIG. 12 is a control flowchart illustrating a method according to another embodiment of the present invention.

Referring to FIGS. 10 and 12, at step 1200, the electronic device 1000 is in the battery power operation state.

At step 1202, the controller 1008 identifies whether the power supply cable is connected to the connector 1010 through the connection identification unit 1026 while the electronic device 1000 is in the battery power operation state.

At step 1204, the controller 1008 outputs a confirmation request message through the display 314 or the audio module 320, when the external power identification unit 1018 identifies that the power supply cable is connected to the connector 1010, at step 1202.

At step 1206, controller 1008 may waits for a user confirmation while outputting the confirmation request message at operation 1204. The user confirmation may be input through the touch module 324 or from an external electronic device of the user through the communication unit 318.

At step 1208, the controller 1008 determines whether the external power is input through the external power identification unit 1018, when the user confirmation on the confirmation request message exists at operation 1206.

At operation 1210, the controller 1008 switches the electronic device 1000 into the external power operation state, when the external power identification unit 1018 identifies that the external power is input, at step 1208.

At step 1212, the controller 1008 outputs an error message, when the external power identification unit 1018 identifies that the external power is not input, at step 1208. The error message may be output in the form of a phrase or a voice indicating that the external power is not input through the display 314 or the audio module 320. The user confirming the error message confirms a connection state of the power supply cable and causes the external power to be properly input into the power supply unit 1004.

Accordingly, when the power supply cable is connected in the battery power operation state, the electronic device selects and uses the external power after the user confirmation.

Methods of controlling the mirror display according to various embodiments of the present invention include identifying that the power supply cable is connected to the connector for inputting the external power in the battery power operation state, outputting the confirmation request message for the connection of the power supply cable, determining whether the external power is input when the confirmation on the confirmation request message is input, and switching the electronic device to the external power operation state when the external power is input.

The above described elements of an electronic device according to various embodiments of the present invention may be formed of one or more components, and a name of a corresponding element may be changed based on the type of electronic device. Electronic devices according to the present invention may include one or more of the aforementioned elements or may further include other additional elements, or some of the aforementioned elements may be omitted. Further, some of the elements of the electronic device according to the various embodiments of the present invention may be combined to form a single entity, and thus, may equivalently execute functions of the corresponding elements prior to the combination.

The term "module" as used herein with respect to various embodiments of the present invention may refer to, for example, a "unit" including one of hardware, software, and firmware, or a combination of two or more of the hardware, software, and firmware. The module may be interchangeable with a term, such as a unit, a logic, a logical block, a component, or a circuit. The module may be a minimum unit of an integrated component or a part thereof. The module may be a minimum unit for performing one or more functions or a portion thereof. The module may be mechanically or electronically implemented. For example, the "module" according to various embodiments of the present invention may include at least one of an Application-Specific Integrated Circuit (ASIC) chip, a Field-Programmable Gate Arrays (FPGAs), and a programmable-logic device for performing operations, including those that have been known or those that are to be developed hereafter.

According to various embodiments of the present invention, at least part of a device (for example, modules or functions thereof) or a method (for example, operations or steps) according to the various embodiments of the present invention may be embodied by, for example, an instruction stored in a computer readable storage medium provided in a form of a programming module. When the instruction is executed by at least one processor (e.g., a processor which may be included in the controller 310), the at least one processor may execute a function corresponding to the instruction. The computer-readable storage medium may be, for example, the storage unit 316. At least some of the programming modules may be implemented (for example, executed) by, for example, the processor At least a part of the programming module may include, for example, a module, a program, a routine, a set of instructions and/or a process for performing one or more functions.

A computer readable recoding medium according to embodiments of the present invention may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions may include high class language codes, which may be executed in a computer by using an interpreter, as well as machine codes made by a compiler. The aforementioned hardware device may be configured to operate as one or more software modules in order to perform the operation of various embodiments of the present invention, and vice versa.

Electronic devices according to various embodiments of the present invention may receive a program including commands for enabling the electronic device to perform the method of controlling the mirror display from a program providing device connected wirelessly or via a wire, and store the received program, and various electronic devices or servers may also be the program providing device. The program providing device may include a memory for storing the program, a communication module for performing wire or wireless communication with the electronic device, and a processor for transmitting the corresponding program to the electronic device according to a request of the electronic device or automatically.

A module or a programming module according to embodiments of the present invention may include at least one of the described elements, a few of the elements may be omitted, or additional elements may be included. Operations executed by a module, a programming module, or other elements according to various embodiments of the present invention may be executed sequentially, in parallel, repeatedly, or in a heuristic manner. Further, some operations may be executed according to another order or may be omitted, or other operations may be added.

While the present invention has been shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of controlling a mirror display, comprising:
applying lighting power generated from one of external power and battery power to a power input terminal of a lighting unit of the mirror display, according to whether the external power is input to the mirror display, wherein the lighting unit includes the power input terminal and an enable terminal, the power input terminal is configured to receive the lighting power, and the enable terminal is configured to receive a signal for enabling or disabling the lighting unit;
applying the external power to a power key to operate a controller while the external power is input to the mirror display and applying the battery power to the power key while the external power is not input to the mirror display, wherein the power key outputs the one of the external power and the battery power while the power key is closed;
connecting one of the controller of the mirror display and the power key to the enable terminal of the lighting unit, such that lighting unit is enabled or disabled according to the signal from one of the controller or the battery power from the power key, according to whether the external power is input to the mirror display;
detecting a battery residual capacity of a battery providing the battery power; and
stopping an operation of a display of the mirror display in response to the external power not being input to the mirror display and the battery residual capacity being less than a predetermined value,
wherein connecting the one of the controller and the power key to the enable terminal of the lighting unit further comprises:
connecting the controller to the enable terminal of the lighting unit in response to the battery residual capacity being equal to or greater than the predetermined value; and
connecting the power key to the enable terminal of the lighting unit in response to the battery residual capacity being less than the predetermined value.

2. The method of claim 1, wherein applying the lighting power comprises applying the lighting power generated from the external power to the lighting unit in response to input of the external power to the mirror display, and applying the lighting power generated from the battery power to the lighting unit in response to the external power not being input to the mirror display.

3. The method of claim 1, further comprising:
controlling, by the controller, the operation of the lighting unit based on at least one of a user setting, a user input, a user proximity, a surrounding luminance, and a control command of an external electronic device.

4. The method of claim 1, wherein stopping the operation of the display comprises:
outputting a low residual capacity notification message; and
stopping the operation of the display in response to input of a confirmation in response to the low residual capacity notification message.

5. The method of claim 1, further comprising:
determining whether a power supply cable is connected to a connector for inputting the external power in a battery power operation state;
outputting, in response to a determination that the power supply cable is connected to the connector for inputting the external power in the battery power operation state, a confirmation request message for a connection of the power supply cable;

determining whether the external power is input in response to a confirmation on the confirmation request message is input; and switching the electronic device to an external power operation state of providing the external power as the operation power in response to a determination that the external power is input.

6. An electronic device, comprising:

a battery;

a mirror display unit configured to perform a mirror display function;

a lighting unit including a power input terminal and an enable terminal;

a lighting power selection unit configured to apply lighting power generated from one of external power and battery power to the power input terminal of the lighting unit, according to whether the external power is input to the electronic device, wherein the power input terminal is configured to receive the lighting power, and the enable terminal is configured to receive a signal for enabling or disabling the lighting unit;

a control power selection unit configured to apply the external power to a power key to operate a controller while the external power is input to the mirror display and applying the battery power to the power key while the external power is not input to the mirror display, wherein the power key outputs the one of the external power and the battery power while the power key is closed;

a lighting control selection unit configured to connect one of a controller of the mirror display and the power key to the enable terminal of the lighting unit, such that lighting unit is enabled or disabled according to the signal from the one of the controller or the battery power from the power key, according to whether the external power is input to the electronic device; and a battery residual capacity detection unit configured to detect a battery residual capacity of the battery, wherein in response to the external power not being input and the battery residual capacity is less than a predetermined value, the controller stops an operation of a display of the mirror display unit, and wherein in response to the battery residual capacity being less than the predetermined value, the controller outputs a low residual capacity notification message, and in response to a confirmation of input of the low residual capacity notification message, the controller stops the operation of the display.

7. The electronic device of claim 6, wherein the controller controls the operation of the lighting unit based on at least one of user setting, a user input, a user proximity, a surrounding luminance, and a control command of an external electronic device.

8. The electronic device of claim 6, further comprising:

a connector connected to a power supply cable to input the external power through the power supply cable; and a connection identification unit configured to identify whether the power supply cable is connected to the connector, wherein the controller is further configured to output a confirmation request message in response to the power supply cable being connected to the connector while the electronic device is in a battery power operation state of providing the battery power as the operation power, and switch the electronic device into an external power operation state of providing the external power as the operation power in response to input of a confirmation in response to the confirmation request message and the external power is input.

* * * * *